No. 650,607. Patented May 29, 1900.
T. MORRISON.
SHEDDING MECHANISM FOR LOOMS.
(Application filed May 26, 1899.)
(No Model.)
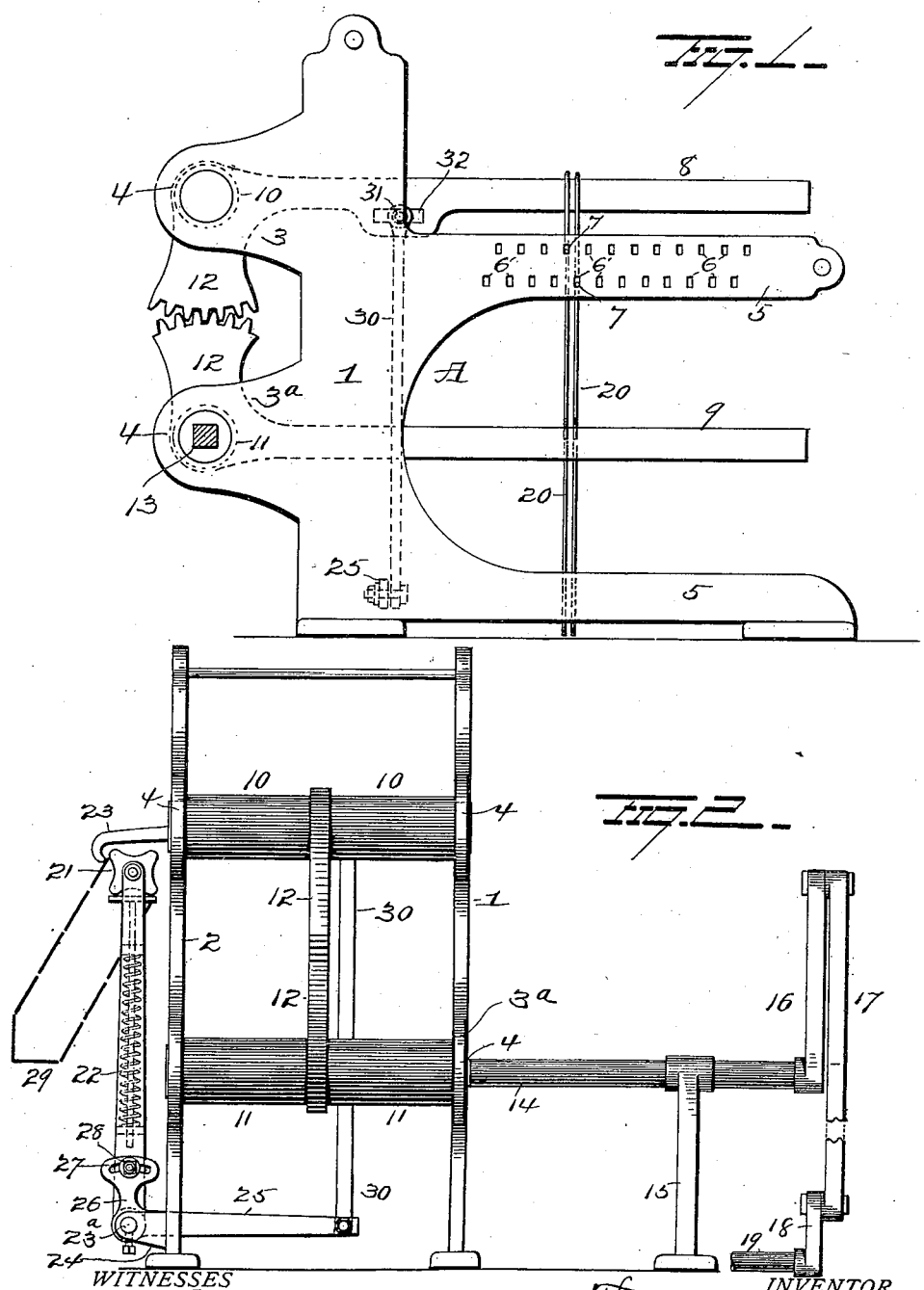

UNITED STATES PATENT OFFICE.

THOMAS MORRISON, OF WILLIAMSPORT, PENNSYLVANIA.

SHEDDING MECHANISM FOR LOOMS.

SPECIFICATION forming part of Letters Patent No. 650,607, dated May 29, 1900.

Application filed May 26, 1899. Serial No. 718,359. (No model.)

*To all whom it may concern:*

Be it known that I, THOMAS MORRISON, of Williamsport, in the county of Lycoming and State of Pennsylvania, have invented certain new and useful Improvements in Shedding Mechanism for Looms; and I do hereby declare the following to be a full, clear, and exact description of the invention, such as will enable others skilled in the art to which it appertains to make and use the same.

My invention relates to an improvement in shedding mechanism for looms, one object of the invention being to reduce to a minimum the number of moving parts and bearings therefor of a shedding mechanism.

A further object is to so construct a shedding mechanism that the journals of the knives or grids will have a small extent of movement on their bearings without limiting the proper throw of the knives or grids.

A further object is to so construct and arrange a shedding mechanism that great extent of movement of the knives or grids can be had.

A further object is to provide means for effecting a direct application of power to the knives or grids of a shedding mechanism and to transmit motion to one knife by the other at a point centrally between the knives or grids.

A further object is to provide simple means whereby the upper knife or grid can be made to regulate the throw of the cylinder.

A further object is to improve and simplify shedding mechanisms for looms and to render the same accurate in operation and effective in the performance of its functions and reduce wear between moving parts to a minimum.

With these objects in view the invention consists in certain novel features of construction and combinations and arrangements of parts, as hereinafter set forth, and pointed out in the claim.

In the accompanying drawings, Figure 1 is an elevation of a shedding mechanism embodying my invention. Fig. 2 is a rear view.

A represents a frame comprising two uprights 1 2, each having rearwardly-projecting arms 3 3ª, provided with journal-bearings 4, and each upright is also provided with a forwardly-projecting arm 5, having numerous perforations 6 for the accommodation of needles 7 of the usual construction. Centrally between the uprights 1 2 the upper and lower knives or grids 8 9 are disposed. The upper knife or grid 8 is provided at its rear end with large laterally-projecting trunnions or journals 10, mounted to oscillate in the bearings 4 of the upper arms 3, and the lower knife or grid 9 is similarly provided at its rear end with large journals or trunnions 11, mounted in the bearings 4 of the lower arms 3ª of the frame. The knives or grids are provided at their fulcrumed ends with toothed segments 12 12, which project toward each other and are in constant mesh centrally between the uprights 1 2 of the frame and in lines parallel with the longitudinal axes of the knives or grids.

One of the lower journals or trunnion 11 is made with an angular socket 13, into which the angular end of a shaft 14 is inserted. The shaft 14 may be suitably mounted in a standard 15 and is provided at its free free end with a long crank-arm 16, to which one end of the pitman 17 is connected. The other end of the pitman is connected with a small crank-arm 18, carried by the main shaft 19 of the loom.

A series of parallel hooked rods 20 are connected with the knives or grids 8 9 and are operated thereby and by the card-cylinder 21 in the usual manner.

By the construction and arrangement of parts above described motion will be transmitted directly to the knives or grids to operate them without the use of numerous movable parts and a consequent multiplicity of wearing-surfaces. Frictional resistance and wear between the parts will be reduced to a minimum and the operation of the apparatus rendered more accurate and effectual than with constructions employing various link or similar appliances for vibrating the knives.

The card-cylinder 21 is carried by and supported at the upper end of a standard 22, and a hooked arm 23 on the frame coöperates with said cylinder in the usual manner. The lower end of the standard 22 is loosely supported by a shaft 23ª, mounted in ears 24, projecting from standard 2. One end of a pitman 25 is also loosely mounted on the shaft 23ª and provided with an upwardly-projecting arm 26, broadened at its upper end and disposed alongside the standard 22, said broadened portion of the arm 26 being provided with an elongated slot 27, into which a pin 28 on the standard projects, and said pin is provided with a nut and washer, by means of which the standard 22 and arm 26 can be secured together at any desired adjustment. When the pitman 25 is moved upwardly, it will cause the standard 22, carrying the cylinder 21 and cards 29, to be thrown outwardly. A rod 30 is pivotally attached at one end to the forward end of the pitman 25, and at its other end said rod is connected with the upper knife or grid 8 by means of a pin 31, projecting from said rod and secured in an elongated slot 32 in the grid. From this construction and arrangement of parts it will be seen that the card-cylinder will be thrown outwardly and then returned by the direct action of the upper knife or grid.

My improvements are very simple in construction, result in reducing the number of parts of a shedding mechanism to a minimum, and are effectual in all respects in the performance of their functions.

The devices may be applied to a right or left hand loom, and slight changes might be made in the details of construction without departing from the spirit thereof or limiting its scope.

Having fully described my invention, what I claim as new, and desire to secure by Letters Patent, is—

In a shedding mechanism for looms, the combination with a frame comprising two uprights, knives or grids disposed between said uprights and having trunnions mounted therein, one of said knives having an elongated slot, intermeshing toothed segments projecting from said trunnions and a card-cylinder, of a pivoted standard carrying said card-cylinder, an arm adjustably connected with said pivoted standard, a rod pivoted to said arm and projecting upwardly to the knife having the elongated slot, and a pin secured in said elongated slot in the knife and pivotally connected with the upper end of said rod.

In testimony whereof I have signed this specification in the presence of two subscribing witnesses.

THOMAS MORRISON.

Witnesses:
  ED. P. WENNER,
  THOS. H. HAMMOND.